United States Patent
Berrada et al.

(10) Patent No.: US 6,731,616 B1
(45) Date of Patent: May 4, 2004

(54) RESERVATION REQUESTING AND ALLOCATING METHOD ON A TRANSMISSION MEDIUM

(75) Inventors: Marouane Berrada, Creteil (FR); Américo Brajal, Villeneuve-le-Roi (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/478,079

(22) Filed: Jan. 5, 2000

(30) Foreign Application Priority Data

Jan. 6, 1999 (FR) .............................................. 99 00059

(51) Int. Cl.$^7$ .............................................. A04B 7/212
(52) U.S. Cl. ....................................... 370/322; 370/443
(58) Field of Search ................................ 370/321, 322, 370/337, 347, 348, 442, 443, 329, 462

(56) References Cited

U.S. PATENT DOCUMENTS

| 4,256,925 | A | * | 3/1981 | Goode ......................... 370/322 |
| 4,491,947 | A | * | 1/1985 | Frank ......................... 370/323 |
| 5,121,387 | A | * | 6/1992 | Gerhardt et al. ............. 370/322 |
| 6,073,010 | A | * | 6/2000 | Dufour ........................ 455/422 |

OTHER PUBLICATIONS

Combined Free/Demand Assignment Multiple Access (CFDAMA) Protocols for Packet Satellite Communications, T. Le–Ngoc et al, Proceedings of the $2^{nd}$ IEEE International Conference on Universal Personal Communications, Ottawa, Canada, Oct. 12–15, 1993, vol. 2, pp. 825–828.

* cited by examiner

Primary Examiner—Chau Nguyen
Assistant Examiner—Soon-Dong Hyun

(57) ABSTRACT

Disclosed is a communication system comprising a main station, a transmission medium, and terminals. The terminals transmit requests to the main station have reservations granted to them on the transmission medium. Each request indicates a number of reservations. Upon receiving a request, the main station adds the number of reservations indicated to an allocation counter associated with the requesting terminal. The invention enables the requesting method to be less vulnerable to data losses. It consists in a resetting of the request counter and allocation counter, for example when an anomaly is detected in the transmission of the data.

9 Claims, 3 Drawing Sheets

RESERVATION REQUESTING AND ALLOCATING METHOD ON A TRANSMISSION MEDIUM

The invention relates to a communication system comprising a main station, a transmission medium, and terminals, said terminals comprising:
- means for transmitting to the main station requests indicating a number of reservations to be granted to the terminal on the transmission medium,
- a counter of requests for counting the reservations which have been requested by the terminal and which have not yet been granted,
- means for calculating the number of reservations to be requested, taking into account the value of the counter of requests, while said main station comprises a set of allocation counters, each associated with a terminal, for counting the reservations to be granted to the relevant terminal. The invention also relates to a terminal designed for use in such a communication system, to a requesting procedure designed for use in such a terminal, and to an updating method for the counter which is to be used in a main station according to the invention.

The invention finds its application, for example, in interactive communication systems by satellite or by radio waves.

Such a system is described in particular in the article "Combined Free/Demand Assignment Multiple Access (CFDAMA) protocols for packet satellite communications" by Tho Le-Ngoc and Jahangir Mohammed, published in the Proceedings of the $2^{nd}$ IEEE International Conference on Universal Personal Communications, Ottawa, Canada, 12–15 Oct. 1993, vol. 2, pp. 825–828.

The requesting method described in this article consists in that the number of reservations which have been requested by the terminal and have not yet been granted to this terminal is monitored so as to calculate the number of reservations to be requested. This method is advantageous because it renders it possible to avoid a repeated reformulation of the same request when the initial request has not yet been granted. It is thus avoided that reservations are unnecessarily requested which are subsequently not used by the terminal. This renders it possible to optimize the shared utilization of the resources by the various terminals. This is particularly important in the case in which the transmission medium is a satellite channel because this type of transmission medium is particularly costly.

This method involves the assumption that the requests which have already been sent and for which no allocation has yet been received are in fact under treatment and will finally be honored. It is accordingly highly vulnerable as regards the loss of data which may arise from bad transmission conditions. In this method, in fact, the lost requests remain counted by the request counter, and the corresponding number of reservations is accordingly taken into account for all subsequent requests. The number of reservations requested by the terminal after such an incident is accordingly continuously lower than the actual need of the terminal. This has the result that the average waiting time for data before transmission is irreversibly increased.

The invention has for its object to remedy the above disadvantage. This object is achieved by means of a communication system as described in the introductory paragraph which is characterized in that said terminals comprise reset means for resetting their request counters and for transmitting to the main station an indicator for resetting the counter of allocations which is associated with the relevant terminal. Such a resetting serves to avoid that the terminal continuously counts reservations which have not been honored. This may relate, for example, to a periodic resetting.

In a more advantageous embodiment, said terminals comprise anomaly detection means and activation means for activating said reset means when an anomaly is detected. This embodiment is more advantageous because it serves to reduce the number of useless reset operations which each lead to an efficiency drop in the granting of reservations on the transmission medium.

The anomaly detection means comprise, for example, comparison means which compare the value of the counter of requests with a preset value. In another example, they comprise comparison means for comparing the value of the counter of requests at a moment t with the sum of the requests transmitted between said moment t and an earlier moment t-P, P being a period (called recovery period) which is sufficiently long for the reservations which were requested before the moment t-P to be granted at the moment t in the absence of an anomaly. If the value of the request counter at a moment t is higher than the sum of requests transmitted between t-P and t, this means that something irregular has occurred, for example that requests have got lost.

The invention will be better understood and further details will become apparent from the following description which is given with reference to the annexed drawings, which are given by way of non-limitative examples and in which:

FIG. 1 diagrammatically shows an example of a communication system according to the invention, FIG. 2 shows an example of a satellite communication system according to the invention, FIG. 3 shows an example of a request procedure according to the invention, FIG. 4 shows a method according to the invention for resetting allocation counters by the main station, FIGS. 5, 6 and 7 are graphs representing results obtained by means of the method according to the invention as compared with results obtained by means of the prior-art method.

FIG. 1 shows an example of a communication system which comprises a main station 1 and a plurality of interactive terminals 2 which communicate via a transmission medium 3. This transmission medium may be of various kinds. For example, it may be a cable network, a radio wave transmission medium, or a satellite link.

In FIG. 2, a choice was made to show a satellite communication system by way of example, because it is in this type of system that the risk of bad transmission conditions is at its highest: bad transmission conditions may affect a specific terminal of a satellite communication system owing to, for example, local weather conditions. The invention, however, is also applicable to other transmission media. The terminals 2 transmit data and requests to the main station 1 via a first satellite 4, using a first frequency band Ka, and the main station 1 distributes data and control information to the terminals 2 via a second satellite 5, using a second frequency band Ku.

In the example to be described, the interactive terminals 1 access the transmission medium 3 by a so-called Time Division Multiple Access (TDMA) mechanism. Time is for this purpose subdivided into time intervals, and time intervals are dynamically granted to the terminals by the main station upon requests from said terminals. In this embodiment, the reservations on the transmission medium requested by the terminals and granted by the main station are accordingly formed by time intervals.

Each terminal 2 comprises a memory 10 which is a transmission waiting list and in which the terminal stores the data to be transmitted in the form of packets. When a terminal i formulates a request with the object of having granted to it a certain number of time intervals, it takes into account the number MEM(i,t) of packets stored in said transmission memory at the relevant moment in time t.

Various requesting mechanisms have been proposed. The mechanisms of the type as described in the article cited in the introduction are particularly effective as regards the optimization in the sharing of resources among the terminals of the communication system. They consist in that the number of reservations already requested and yet to be honored are counted for each terminal. Each terminal is provided with a counter COUNT(i) referred to as request counter which is incremented by one each time a reservation is requested and decremented by one each time an allocation is received. Each request transmitted by a terminal i indicates the difference between the contents MEM(i,t) of its transmission memory and the value COUNT(i) of its request counter at a given moment t. At the level of the main station, each new request received for a terminal is added to the previous one: the number of reservations to be granted to each terminal is stored in a counter ALLOC(i) associated with the relevant terminal, which counter is incremented whenever a request for a reservation is received by the main station and decremented whenever reservations are granted to said terminal.

Such a mechanism has the disadvantage that it is particularly vulnerable to data losses which may result from bad transmission conditions. The invention in particular consists in an improvement in this type of request mechanism so as to render it better able to cope with data losses.

FIG. 3 shows a preferred embodiment of a request mechanism according to the invention. This mechanism is carried out by a terminal when it is about to transmit a request to the main station. The moment when this mechanism is put into operation by the terminal i will be referred to as t.

In box 50, the terminal i carries out a test for detecting a possible anomaly. For this purpose it compares the value of the request counter COUNT(i) with the sum $$\sum_{t-P}^{t} RESA(i,t)$$

of the requests transmitted between the moment t under consideration and an earlier moment t-P, with P being a recovery period which is long enough so that the reservations requested before the moment t-P have been granted at the moment t in the absence of an anomaly.

If the value of the request counter COUNT(i) at this moment t is higher than the sum of the transmitted requests between t-P and t (arrow N in the Figure), this means that something irregular has occurred, for example that requests have got lost. The terminal then resets its request counter COUNT(i) in box 51N (COUNT(i)=0), and it sets the value of a reset indicator F(i) for one (this reset indicator will be transmitted to the main station together with the request from the terminal, in box 55). Then it continues its operation with box 52.

If not (arrow Y in the Figure), no anomaly has been detected. The value of the reset indicator F(i) is set for zero in box 51Y, whereupon the operation continues with box 52.

In box 52, the terminal calculates the number of reservations RESA(i,t) to be requested: this number of reservations is equal to the number of packets MEM(i,t) contained in the transmission memory of the terminal i at the moment t, deduced from the value COUNT(i) of the request counter of the terminal i at the moment t: RESA(i,t)=MEM(i, t)-COUNT(i).

In box 53, the terminal then stores the value obtained RESA(i,t) in a FIFO memory ("First In First Out") with a length P.

In box 54, the terminal now updates the value of its request counter:

COUNT(i)=COUNT(i)+RESA(i,t).

Then, in box 55, it transmits its request R{RESA(i,t); i; F(i)} in a time interval granted to it, following a range of payload data.

The choice of the value of the recovery period P is important. In general, the value of P should be chosen such that includes the transmission time to and fro on the transmission medium in question, plus the processing time required by the main station, which depends on the degree of occupation of the transmission medium and on the number of terminals connected to the communication system. To avoid too frequent reset operations, and thus drops in efficiency in the sharing of the resources, the value of P should be estimated somewhat on the high side.

FIG. 4 shows an example of how allocation counters ALLOC(i) stored in the main station are updated. In box 60, the main station receives a request R{RESA(i,t); i; F(i)} originating from the terminal i. In box 61 it tests the value of the reset indicator F(i). If F(i) is positive (F(i)=1), the operation continues with box 62. If not, it goes to box 63. In box 62, the allocation counter ALLOC(i) is reset (ALLOC(i)=0). The operation then continues with box 63. In box 63, the allocation counter is incremented by the number of reservations indicated in the request R: ALLOC(i)=ALLOC(i)+RESA(i,t).

FIGS. 5, 6 and 7 show the results obtained with the invention in a communication system as shown in FIG. 2, having the following characteristics:

the communication system comprises 10 stations which generate a traffic corresponding to an occupation rate of 75% of the transmission media in a homogeneous manner, the transmission time to and fro is of the order of 0.5 second, a deterioration in the transmission conditions arises at the moment t=300 s, causing a loss of data during 6 s for the terminal i=K only, P is set for 10 s.

as a function of time, for P=10 s. A single detection of an anomaly is found, and accordingly a single reset of the counters for requests and allocations at the moment t=320 s.

Figure 1:
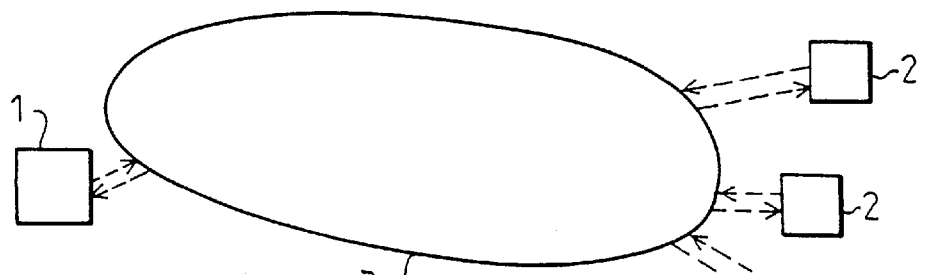
Figure 2:
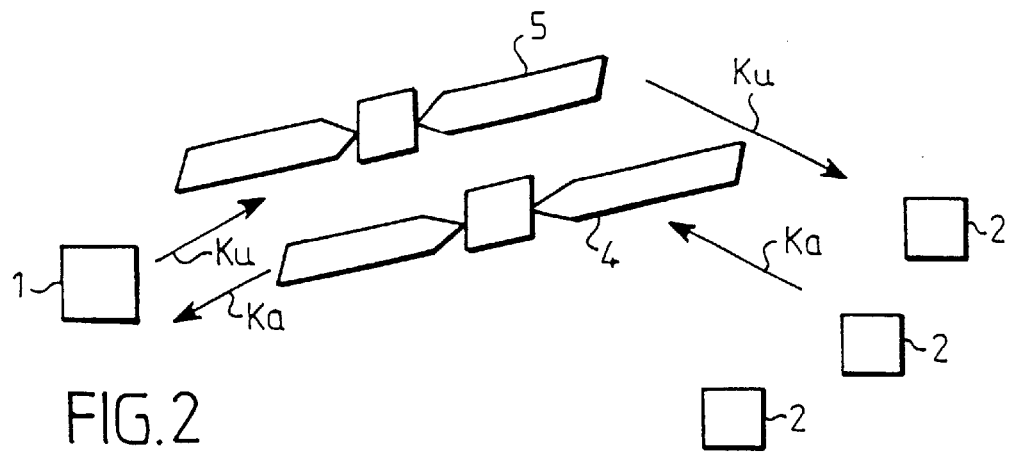
Figure 3:
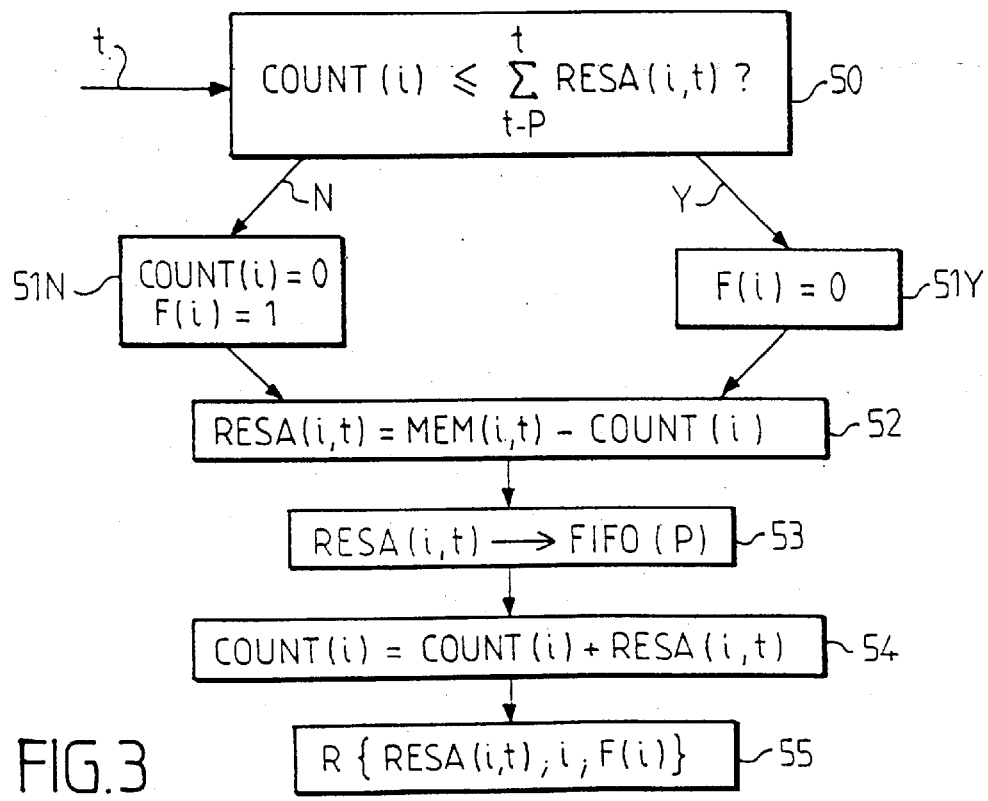
Figure 4:
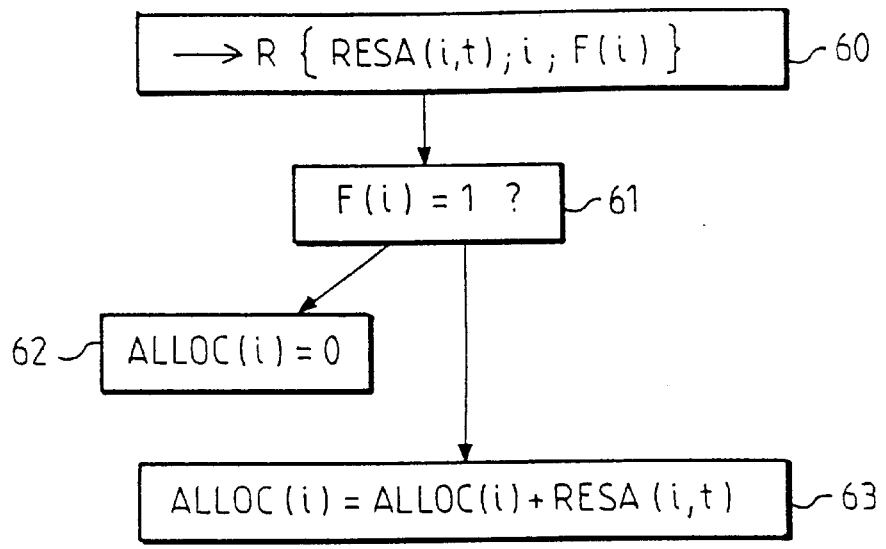
Figure 5:
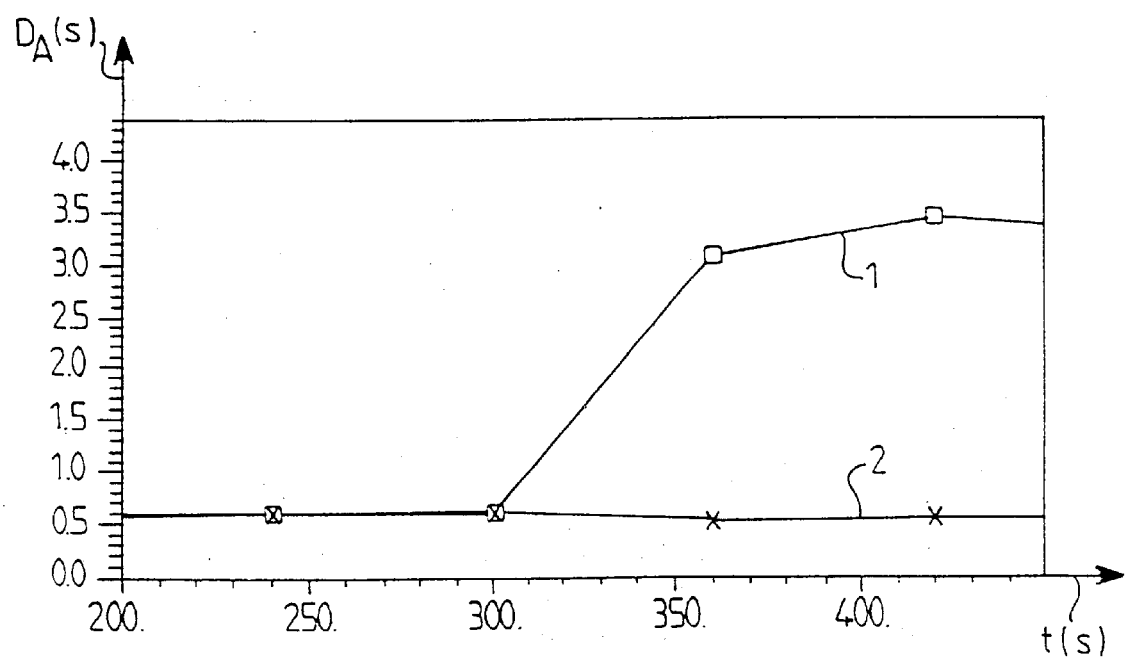
FIG. 5 shows the influence of the data loss on the average waiting time in the transmission memory $D_A$ (expressed in seconds) with a request mechanism according to the prior art for the terminal i=K (curve 1) and for the other terminals i≈K (curve 2). The irreversible increase in the average waiting time in the transmission memory for the terminal which has suffered the data loss is apparent.
Figure 6:
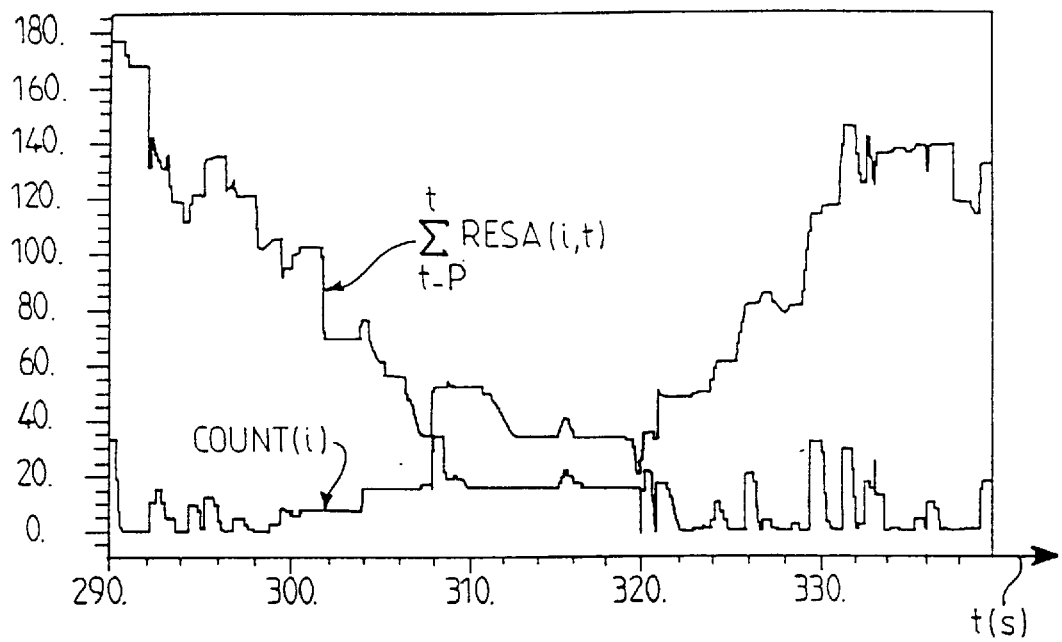
FIG. 6 shows the values of the variables COUNT(i) and $$\sum_{t-P}^{t} RESA(i,t)$$
Figure 7:
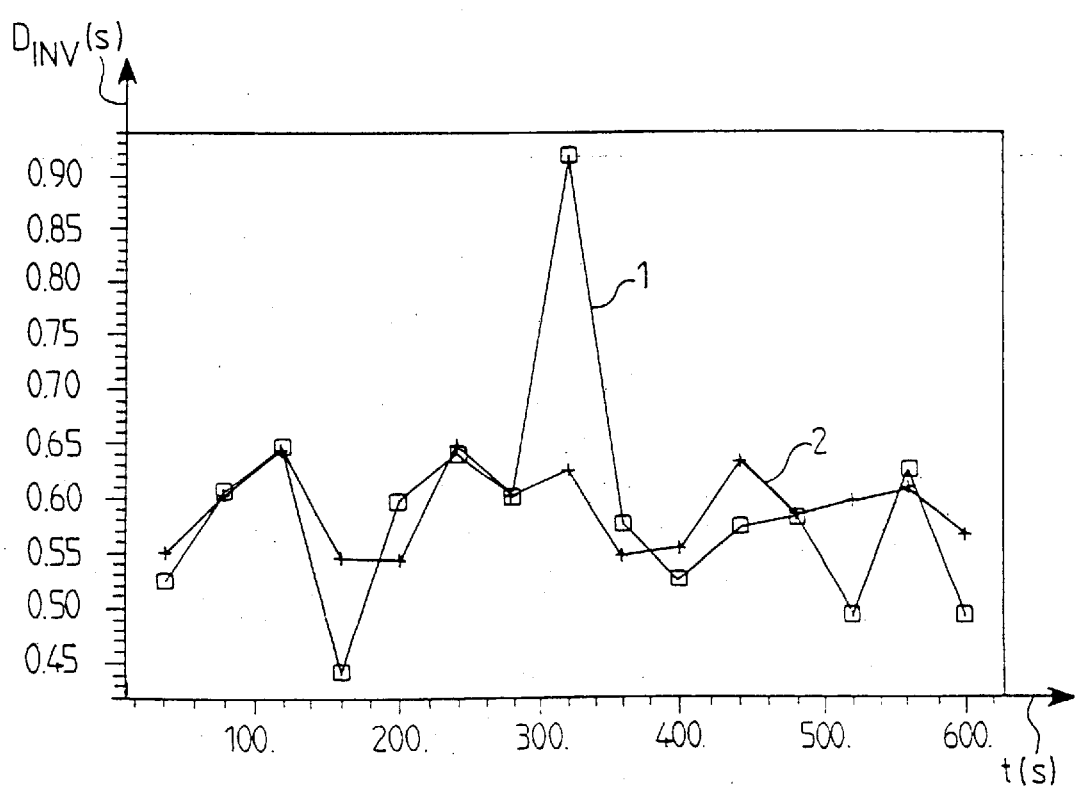

FIG. 7 shows the average waiting time in the transmission memory $D_{INV}$ (expressed in seconds) with a request mechanism according to the invention for the terminal i=K (curve 1) and for the other terminals i≈K (curve 2), with P=10 s. This average delay increases for the terminal i=K for a short period and then returns to its normal value.

What is claimed is:

1. A communication system comprising a main station (1), a transmission medium (3, 4, 5), and terminals (2), said terminals comprising:

means for transmitting to the main station requests (R) indicating a number of reservations to be granted to the terminal on the transmission medium (RESA(i,t)), a counter of requests (COUNT(i,t)) for counting the reservations which have been requested by the terminal and which have not yet been granted, means for calculating the number of reservation (RESA (i,t)) to be requested, taking into account the value of the counter of requests (COUNT(i,t), while said main station comprises a set of allocation counters (ALLOC(i)), each associated with a terminal, for counting the reservation to be granted to the relevant terminal, characterized in that said terminals comprise reset means for resetting their request counters and for transmitting to the main station a reset indicator (Fri)) for resetting the counter of allocations which is associated with the relevant terminal.

2. A communication system as claimed in claim 1, characterized in that said terminals comprise anomaly detection means (50) and activation means (51N) for activating said reset means when anomaly is detected.

3. A communication system as claimed in claim 2, characterized in that said anomaly detection means comprise comparison means for comparing the value of said request counter at a moments t with the sum of the request transmitted between said moment t and an earlier moment t-P, P being a period which is sufficiently long for the reservations which were requested before the moment t-P to be granted at the moment t in the absence of an anomaly.

4. A terminal (2) designed for use in a communication system comprising a transmission medium (3, 4, 5) and a main station (1), which terminal comprise:

means for transmitting to the main station requests which indicate a number of reservations to be granted to the terminal on the transmisssion medium (RESA(i,t)), updating of a request counter (COUNT(i)) which indicates the number of reservations already requested which have not yet been granted, calculation of the number of reservations to be requested (RESA(i,t)), taking into account the value of the request counter, resetting the value of the request counter (51N), and trasmitting (55) to the main station a reset indicator (F(i)) of an allocation counter (ALLOC(i)) stored in the main station which counts the reservations to be granted to said terminal.

5. A terminal as claimed in claim 4, characterized in that it comprises anomaly detection means (50) and activation means (51N) for activating said reset means when an anomaly is detected.

6. A terminal as claimed in claim 5, characterized in that said anomaly detection means comprise comparison means for comparing the value of the request counter at a moment t and an earlier moment t-P, the value of P being sufficiently high so that the reservations requested before the moment t-P have been granted at the moment t in the absence of an anomaly.

7. A method to enable a terminal (2) to have granted to it by a main station (1) a certain number of reservations on a transmission medium (3), said method comprising the steps of:

updating of a request counter (COUNT(i)) which indicates the number of reservations already requested which have not yet been granted, calculation of the number of reservations to be requested (RESA(i,t)), taking into account the value of the request counter, resetting the value of the request counter (51N), and transmitting (55) to the main station a reset indicator (F(i)) of an allocation couner (ALLOC(i)) stored in the main station which counts the reservations to be granted to said terminal.

8. The method as claimed in claim 7, further including an anomaly detection step (50), and in that said resetting step (51N) is carried out whenever an anomaly is detected.

9. The method as claimed in claim 8, wherein the anomaly detection step comprises a comparison step comparing the value of the request counter at a moment t with the sum of the requests transmitted between this moment t and an earlier moment t-P, the value of P being sufficiently high so that the reservations requested before the moment t-P have been granted at the moment t in the absence of an anomaly.

* * * * *